June 21, 1932.   H. C. ELLISON   1,864,235
MACHINE FOR THREADING BOLTS AND THE LIKE OBJECTS
Filed Feb. 5, 1930   7 Sheets-Sheet 1

INVENTOR
HARRY C. ELLISON
BY
ATTORNEYS

June 21, 1932. H. C. ELLISON 1,864,235

MACHINE FOR THREADING BOLTS AND THE LIKE OBJECTS

Filed Feb. 5, 1930 7 Sheets-Sheet 2

INVENTOR
HARRY C. ELLISON
ATTORNEYS

June 21, 1932. H. C. ELLISON 1,864,235
MACHINE FOR THREADING BOLTS AND THE LIKE OBJECTS
Filed Feb. 5, 1930 7 Sheets-Sheet 3

INVENTOR
HARRY C. ELLISON
BY *Hull, Brock & West*
ATTORNEYS

June 21, 1932.   H. C. ELLISON   1,864,235
MACHINE FOR THREADING BOLTS AND THE LIKE OBJECTS
Filed Feb. 5, 1930   7 Sheets-Sheet 4

INVENTOR
HARRY C. ELLISON
BY
ATTORNEYS

June 21, 1932.  H. C. ELLISON  1,864,235
MACHINE FOR THREADING BOLTS AND THE LIKE OBJECTS
Filed Feb. 5, 1930   7 Sheets-Sheet 6
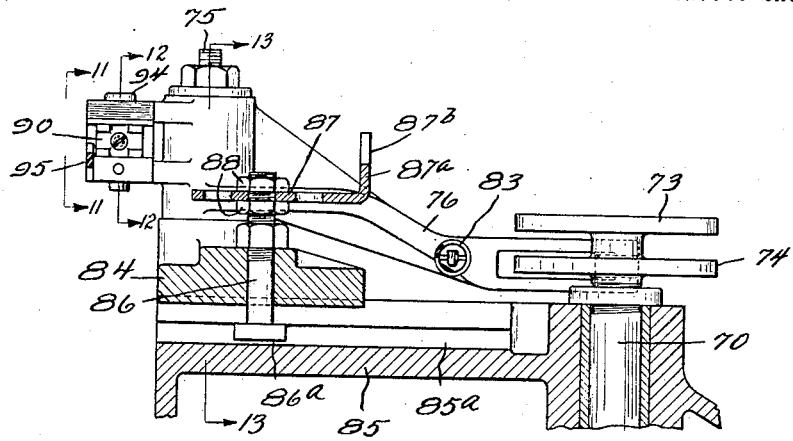
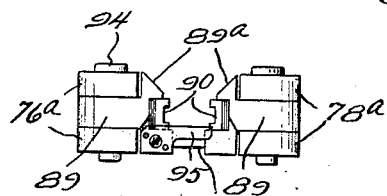
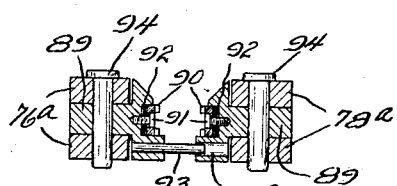
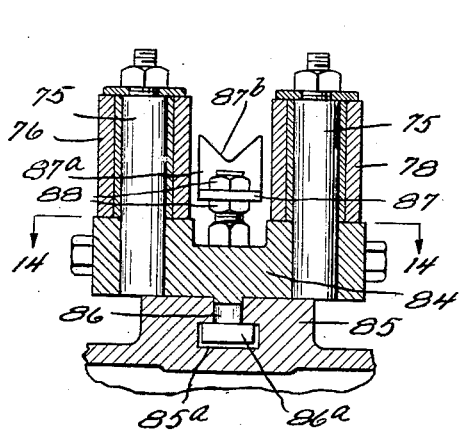
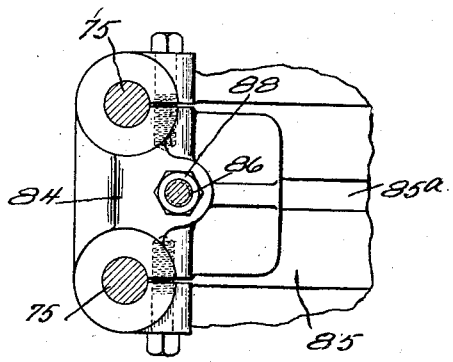
INVENTOR
HARRY C. ELLISON
BY
ATTORNEYS

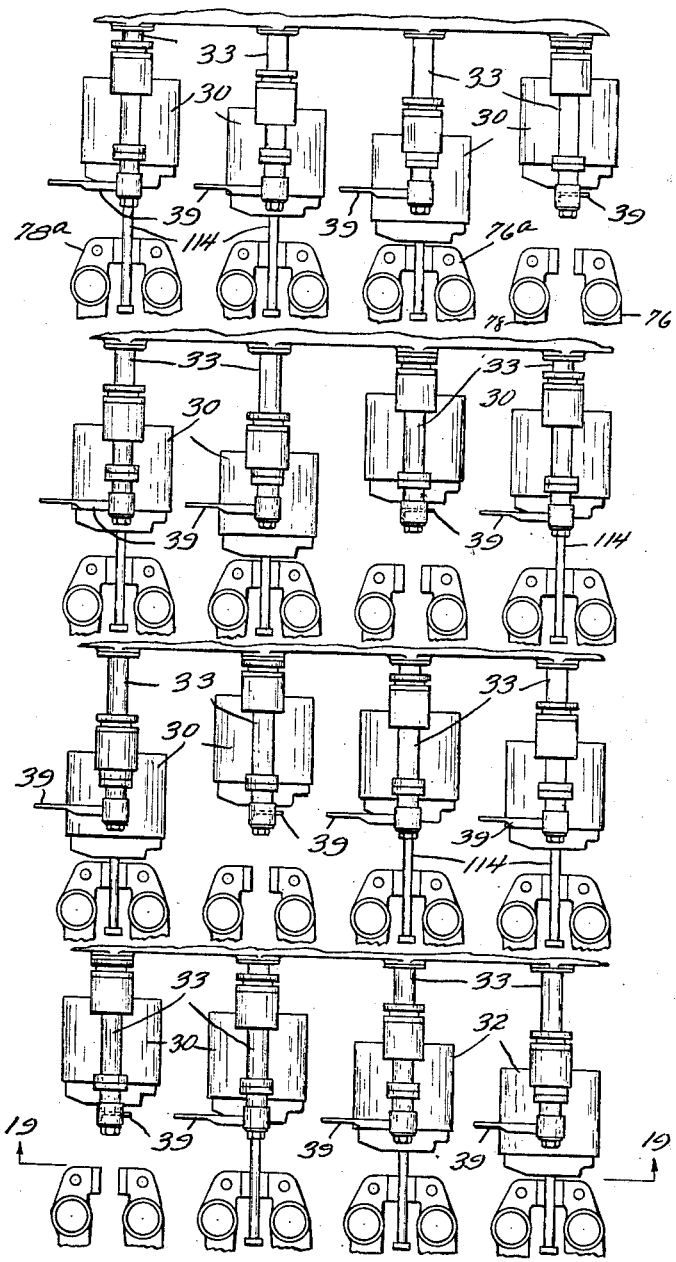
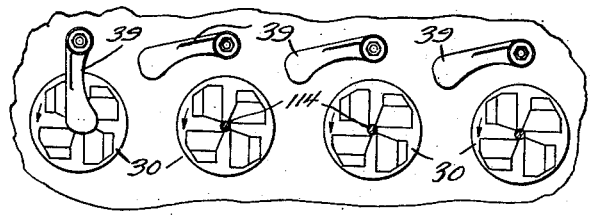

Patented June 21, 1932

1,864,235

UNITED STATES PATENT OFFICE

HARRY C. ELLISON, OF LAKEWOOD, OHIO, ASSIGNOR, BY MESNE ASSIGNMENTS, TO REPUBLIC STEEL CORPORATION, A CORPORATION OF NEW JERSEY

MACHINE FOR THREADING BOLTS AND THE LIKE OBJECTS

Application filed February 5, 1930. Serial No. 426,047.

This invention relates to machines for threading bolts and similar objects and has for its general object to improve the efficiency and increase the output of machines of this character. Further and more limited objects and advantages will appear hereinafter in connection with the detailed description and will be covered by the combination of elements embodied in the claims.

Figure 1:
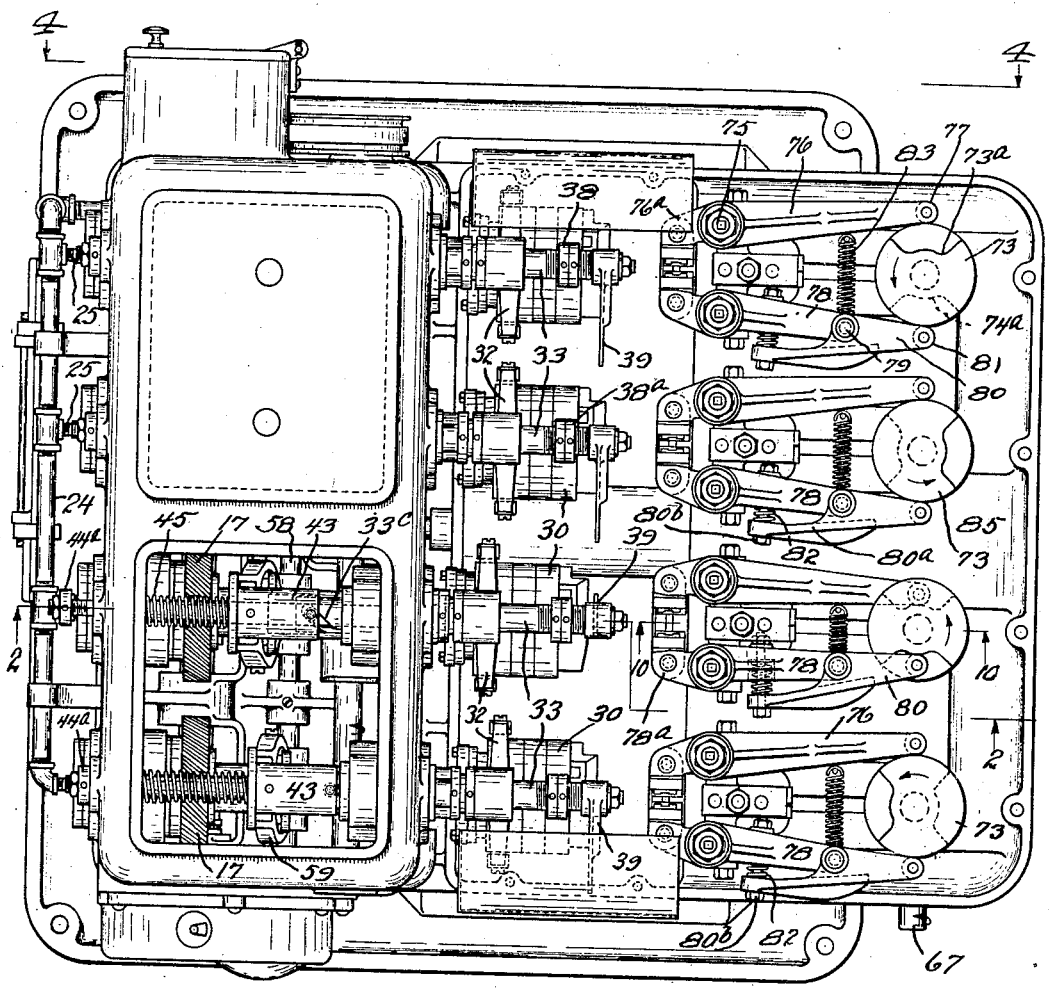
Figure 20:
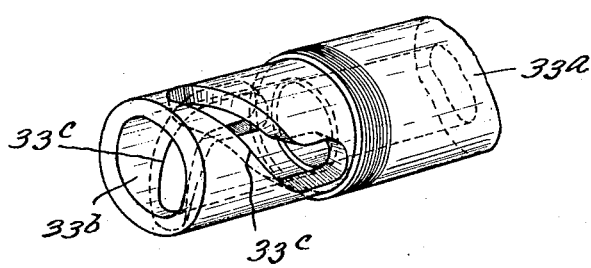
Figure 2:
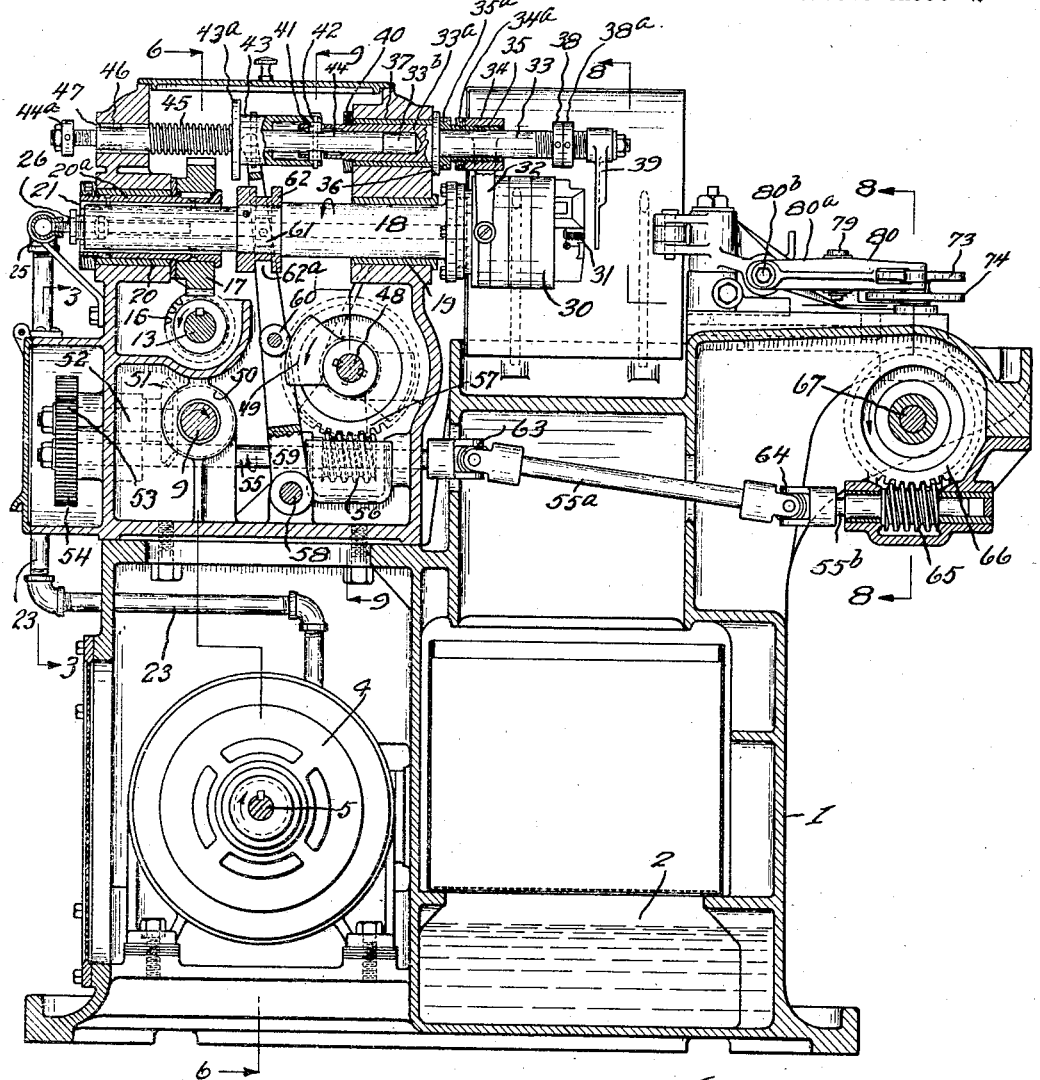
Figure 3:
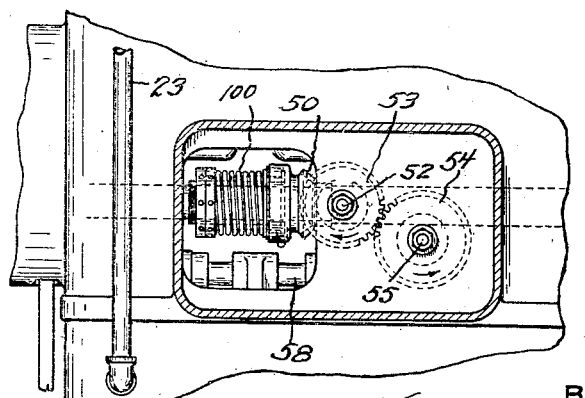
Figure 4:
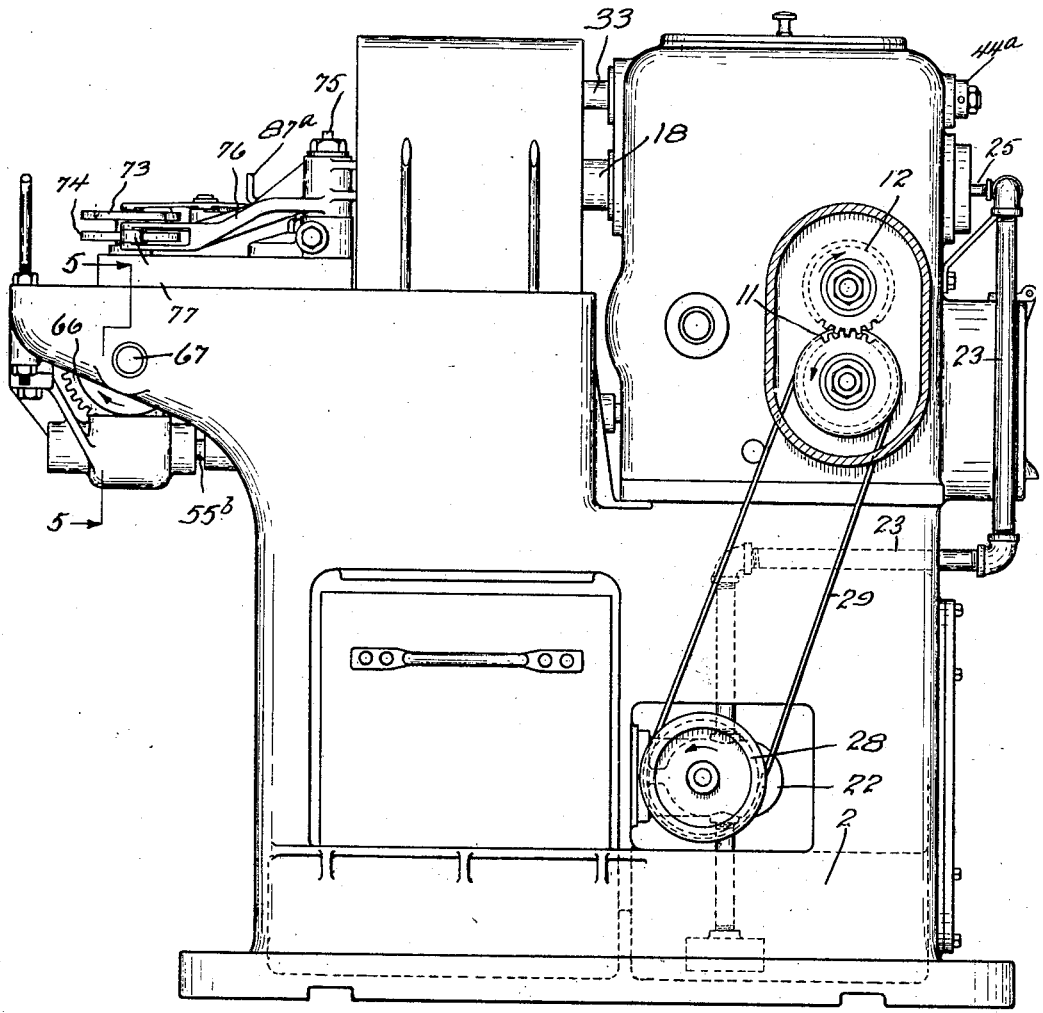
Figure 5:
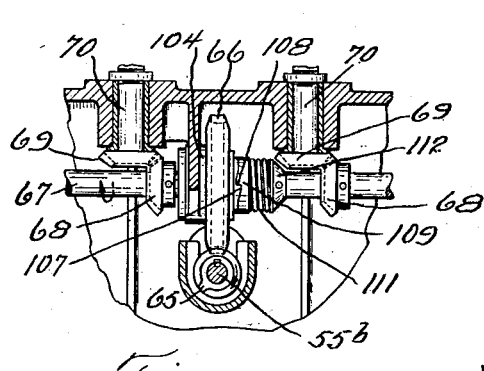
Figure 6:
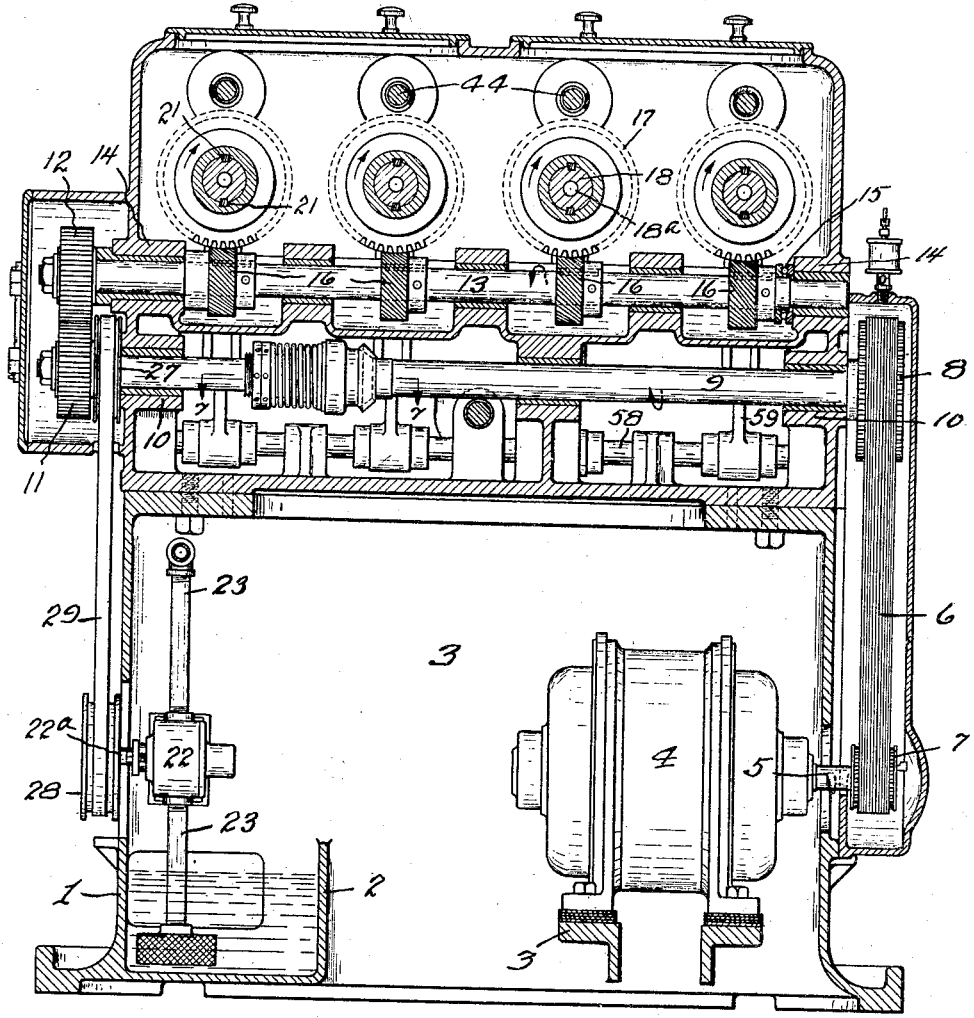
Figure 7:
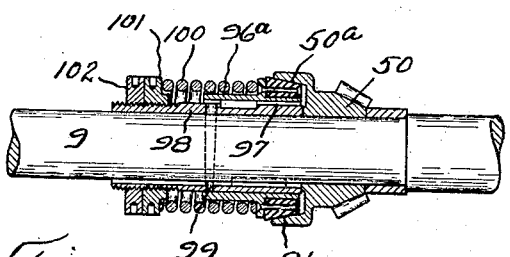
Figure 8:
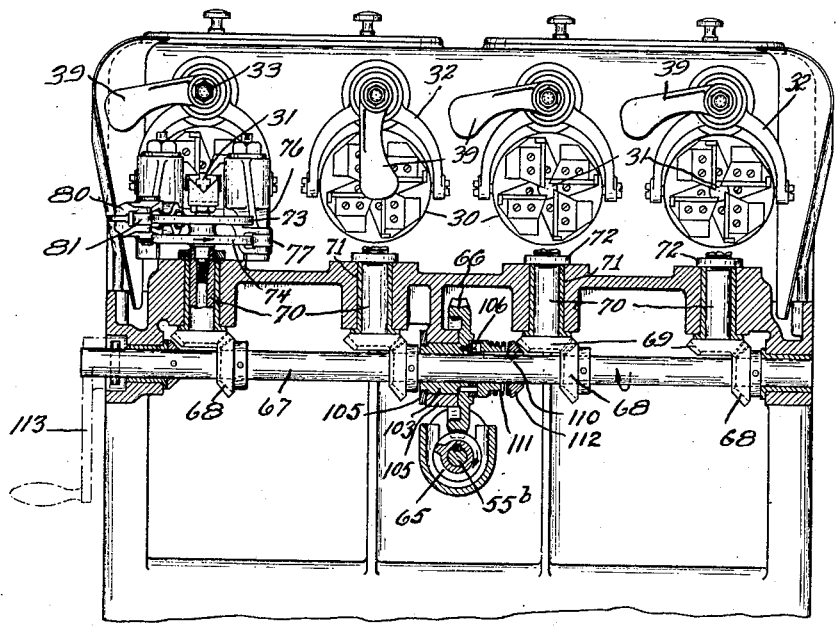
Figure 9:
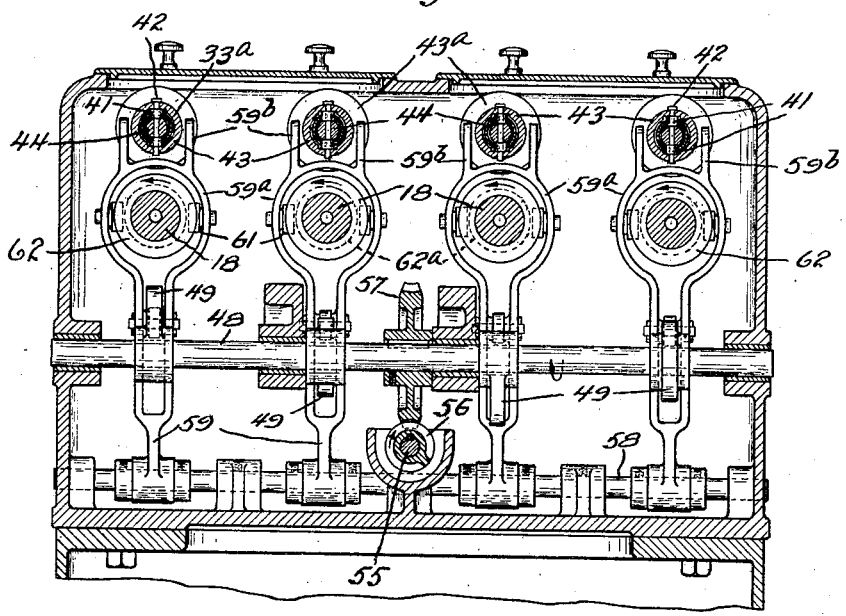

In the drawings, which embody the preferred form of my invention, Fig. 1 represents a plan view of a machine constructed in accordance with my invention, certain parts of the housing being removed; Fig. 2 a longitudinal sectional view through said machine corresponding to the line 2—2 of Fig. 1; Fig. 3 is a detail in section corresponding to the line 3—3 of Fig. 2; Fig. 4 a sectional elevation of the machine corresponding to the line 4—4 of Fig. 1; Fig. 5 a detail in section corresponding to the line 5—5 of Fig. 4; Fig. 6 a detail in section corresponding to the line 6—6 of Fig. 2; Fig. 7 a detail in sectional elevation of the slip clutch on the main shaft, the detail corresponding substantially to the line 7—7 of Fig. 6; Figs. 8 and 9 are details in section corresponding respectively to the lines 8—8 and 9—9 of Fig. 2; Fig. 10 is a detail in section corresponding to the line 10—10 of Fig. 1; Figs. 11, 12 and 13 are details in elevation and section corresponding respectively to the lines 11—11, 12—12, and 13—13 of Fig. 10; Fig. 14 a detail in section corresponding to the line 14—14 of Fig. 13; Figs. 15, 16, 17 and 18 are details in plan of the die heads, chucks and stops, showing the manner in which they operate in series upon the bolt blanks; Fig. 19 a detail in end elevation of the chucks and stops, corresponding to the line 19—19 on Fig. 18; and Fig. 20 a detail in perspective of one of the cams which operate the stop-carrying rock shafts.

The machine described and illustrated herein comprises generally a motor; a main shaft driven from said motor; a spindle-operating shaft driven from the main shaft; a series of reciprocable spindles each having a die head and threading dies thereon and driven from the spindle-operating shaft; a rock shaft mounted adjacent each spindle and each carrying a work stop and each arranged and adapted to be rocked automatically to bring the stop thereon into and out of work-intercepting relation to the die heads; a chuck opposed to each spindle and the die head and dies thereon; a shaft driven from the main shaft; connections between the last-mentioned shaft and the chucks for automatically closing the latter against the work therein and for opening the chucks when the threading operation is completed; and means for opening the die heads on the completion of the threading operation and for closing them after having been retracted, at which time the stops will have been automatically moved in front of the die heads, the various operating mechanism being timed so as to reciprocate the spindles in succession and to rock the stop shafts and open the dies and the chucks in succession.

Describing the various parts of the machine by reference characters, 1 denotes the housing of the machine, the same having a reservoir 2 therein containing a cooling and lubricating liquid which is pumped through the work spindles to the threading dies.

Mounted on brackets 3 in said housing is an electric motor 4 having a shaft 5 which, by means of the silent chain 6 and the pulleys 7 and 8, drives the main shaft 9, the said shaft being journaled in bearings 10 provided on opposite sides of the housing. The shaft 9 drives, through a spur gear 11 and a spur gear 12, the spindle-operating shaft 13. The shaft 13 is also mounted in bearings 14 in the sides of the housing, and a portion of the shaft which is adjacent the housing opposite the pulley 12 is provided with a thrust bearing 15. The shaft 13 is provided with a plurality of worms 16, four such worms being shown and each meshing with a worm gear 17 on a spindle 18, four of which are shown. Each of the spindles 18 is slidably mounted in a front bearing 19 and a rear bearing 20, being slidably keyed within a bushing 20$^a$ located in the latter bearing, as indicated at 21 (see Figs. 2 and 6). Each of the spindles 18 is provided with a bore 18$^a$ extending therethrough from rear to front, which bore receives cooling and lubricating liquid delivered from the reservoir 2 by means of a pump 22 and a pipe 23, which pipe delivers the cooling fluid to a transverse pipe 24 extending across the rear of the machine and having tubular connections 25 each of which projects into a spindle bore 18$^a$, through a stuffing box 26 in the rear of each spindle. The pump shaft 22$^a$ is driven from the main shaft 9 by means of pulleys 27, 28 and a belt 29.

Each spindle 18 carries at the front thereof a die head 30 having a plurality of threading dies 31 therein—see Figs. 2 and 8. Each die head has connected thereto a yoke 32 for opening and closing the dies, the yokes each being adjustably mounted on a rock shaft 33 above the die head and spindle cooperating therewith by means of a sleeve 34 threaded on a sleeve 35 which is slidable upon the said rock shaft, there being a lock nut 34$^a$ to lock each sleeve 34 in its adjusted position and each sleeve 35 being provided with a head 35$^a$ at the rear thereof which is adapted to abut against a flange 36 conveniently formed on the front of a bearing bushing 37. The flange 36 constitutes a rear stop for closing the dies in the die head when engaged by the flange 35$^a$. For the purpose of opening the dies, each rock shaft is provided with a front stop 38 threaded thereon and adapted to be locked in adjusted position by a locking ring 38$^a$. The detailed mechanism by which the yoke 32 will open and close the dies is well known to those skilled in the art and needs no further illustration.

On the front of each rock shaft 33 is carried a work stop arm 39, which will be operated in the manner and for the purpose to be described hereinafter.

Each rock shaft 33 is provided with an enlarged hollow rearward extension 33$^a$ mounted in a bearing bushing 37 and each such extension is provided with a bore 33$^b$ extending thereinto from the rear end thereof; also with a locking ring 40 threaded thereon and adapted to engage the rear wall of the bearing. The hollow rearward extension of each shaft 33 is provided with a pair of cam tracks 33$^c$, which cam tracks receive rollers 41 on a pin 42, said pin extending through the rear portion of the shaft extension 33$^a$ and through a sleeve 43 surrounding the rear end of such extension and through a rod 44 which has its front end mounted in the bore 33$^b$ and its rear end extending through the rear of the housing, where it is provided with an adjustable stop 44$^a$. Each sleeve 43 is provided at its rear end with a flange 43$^a$ which is engaged by the rear end of a helical spring 45 surrounding each rod 44 and bearing at its rear end against the housing. Each rod 44 is slidably mounted in a bearing 46 in the rear of the housing and is held against rotation in said bearing by keys 47.

It will be evident that, if the springs 45 be free to press the sleeves 43 forwardly, this will result in pushing the rods 44 forwardly and will rotate the shafts 33 through the engagement of the rollers 41 with the cam tracks 33$^c$. These tracks are of such contour and extent that the forward movements of the rods 44 will impart a quarter revolution to each of the shafts 33. This will result in rotating the shafts to bring the stops 39 respectively thereon in a substantially horizontal position above the dies and die heads therebelow, as shown in Fig. 8. When the rods 44 are moved rearwardly, by means to be described hereinafter, the corresponding shafts 33 will be rocked in the opposite direction, thereby to bring the stops 39 thereon in front of the dies 31, as shown more particularly in Fig. 2.

For the purpose of controlling the movements of the spindles 18 and shafts 33, I provide a cam shaft 48 having cams 49 thereon, one for each spindle, and drive the same from the main shaft 9 by means of a bevel gear 50 on the main shaft 9 and a bevel gear 51 on a stub shaft 52, and a spur gear 53 on the outer end of the stub shaft meshing with the spur gear 54 on the outer end of a shaft comprising the sections 55, 55$^a$ and 55$^b$, the section 55 driving the cam shaft 48 through a worm 56 and a worm gear 57. The cams 49 are spaced about 90° apart (from center to center) on the shaft 48.

Pivoted on a rod 58 extending transversely of the housing is a plurality of forked arms 59, one for each spindle and rock shaft, and between the lower forks of each arm is a roller 60 which is adapted to be engaged by one of the cams 49. Above the roller 60, each of the arms is formed into a collar, as shown at 59$^a$ (Fig. 9) which collar carries rollers 61 which enter opposite sides of a circular groove 62$^a$ provided in a collar 62 pinned to the cooperating spindle 18. From each collar 59$^a$, forks 59$^b$ extend upwardly on opposite sides of the sleeve 43 thereabove and bear at their upper ends against the rear face of the flange 43$^a$ on such sleeve.

By virtue of the construction just described, it will be evident that, when the cams 49 ride off the rollers 60, the rods 44 will be pressed forwardly by the springs 45, not only moving the stops 39 out of the way of the dies 31, but also moving the spindles 18 forwardly, the parts being so proportioned that, at the end of the forward movement of the rods and spindles, the dies will have engaged their respective bolt blanks and have started threads thereon, after which the spindles will be moved forwardly by the threading engagement between their respective dies and the bolt blanks, the latter being held meanwhile in chucks, which will be described hereinafter. The shaft section 55 is connected to an angularly extending shaft section 55$^a$ by a universal joint 63, and this section in turn is connected to a front section 55ᵇ by a universal joint 64. The front shaft section carries a worm 65 meshing with a worm gear 66 on a shaft 67 extending transversely of the machine and at the front thereof. This shaft 67 serves to open the chuck jaws to permit the insertion of the work therein, the jaws being closed thereafter by means of springs. The construction of the chucks and the connections whereby they are operated from the shaft 67 will now be described.

The shaft 67 is provided with a plurality of bevel gears 68 thereon, one for each chuck, four of which are shown. Each of these gears meshes with a bevel gear 69 on the bottom of a hollow vertical shaft 70. Each shaft 70 is mounted in a vertical bearing 71 and is supported on said bearing by a collar 72. (See Fig. 8.) The upper end of each shaft 70 is provided with a pair of vertically spaced cams, indicated at 73 and 74, each cam having a recess 73ᵃ, 74ᵃ therein respectively, the centers of the recesses on the upper and lower cams being arranged and spaced approximately 180° apart and each recess extending about one quarter the circumference of its cam. These cams cooperate with the front ends of the levers which carry the chuck jaws, each of said levers being pivoted intermediate its ends on a vertical stud 75. One of each pair of levers has a long continuous forwardly extending arm 76 and a short rearwardly extending arm 76ᵃ and has its front end forked and is provided in such fork with a roller 77 adapted to engage the cam 74. The other lever comprises a shorter front arm 78 and a short rear arm 78ᵃ, similar to the arm 76ᵃ. The arm 78 does not extend forwardly as far as the cam which operates the same; but has pivoted thereto at 79 a lever comprising a forwardly extending arm 80 having its front end forked and provided with a roller 81, the rear arm 80ᵃ of said lever being movably connected to the arm 78 by a bolt 80ᵇ extending therethrough and a spring 82 surrounding a portion of the bolt and engaging the arms 78 and 80ᵃ and tending thereby to press the roller 81 against the cam 73. The arms 76 and 78 are connected by springs 83, which springs also tend to hold the rollers 77 and 81 in engagement with their respective cams.

Each pair of studs 75 is supported by a base 84 which is adjustably mounted on the bed plate 85 by means of a T slot 85ᵃ in said bed plate and a bolt 86 extending through the base 84 and having its head 86ᵃ mounted in the enlarged part of the slot. Adjustably mounted on the upper end of each bolt 86 is a work support comprising a base 87 clamped to each bolt by and between nuts 88, the said work support comprising also a vertical flange 87ᵃ having a V-shaped notch 87ᵇ extending downwardly from the top thereof.

Each pair of rearward arms 76ᵃ and 78ᵃ is forked (see Figs. 10 and 11) and between these forks are mounted the chuck jaws comprising each a jaw block 89 having a downwardly inclined surface 89ᵃ for the insertion of the work to and between the clamps proper, indicated at 90, the said clamps being secured to the blocks 89 by means of bolts 91 and being adjustable with respect to the blocks and to each other by means of shims 92. In order to retain the clamps in substantial parallelism and to prevent unnecessary and undesirable rocking movement thereof, one of the blocks is provided with a pin 93 which enters a guide opening 93ᵃ provided in the other or opposed block. When the arms 76ᵃ and 78ᵃ are moved apart to open the chuck jaws through the action of the spring 83, the jaw blocks 89 can rock sufficiently on their pivot pins 94 to keeps the clamps 93 opposed to and substantially parallel with each other, thereby enabling them to receive readily a bolt blank dropped therebetween. One of the blocks 89 of each pair is also provided with a work rest constituted by a plate 95 secured thereto and extending across the space between the bottoms of the clamps 90, the upper edge of the work rest being on the same level as the bottom of the seat provided by the notch 87ᵇ and supporting the work (bolt blank) with its axis in alignment with the axis of the cutting head opposed thereto.

The shaft comprising the sections 55, 55ᵃ and 55ᵇ is driven (indirectly) by the bevel gear 50 on the shaft 9. As it may be desirable to break the driving connection between said shafts, as, for instance, should too much resistance be opposed to the rotation of the shaft 55—55ᵇ by the shaft 48, or by the shaft 67, or by both, I employ a slip-clutch connection between the bevel gear 50 and the shaft 9. This slip clutch construction is shown more particularly in Fig. 7. The gear 50 is sleeved upon the shaft 9 and is connected thereto by a conical seat 50ᵃ at one end thereof receiving the conical friction member 96ᵃ secured to a sleeve 96ᵃ which is slidably keyed at 97 upon a sleeve 98 pinned to the shaft 9, as shown at 99. A coil spring 100, surrounding the sleeve 96 and abutting against an adjustable stop 101 threaded on the sleeve 98, tends to hold the cone clutch 96 in engagement with the conical seat 50ᵃ on the gear 50. The stop 101 is secured in an adjusted position by a lock nut 102. Should the gear 50 be subjected to a severe strain, it can slip on the clutch surface 96, thus saving the parts from injury.

It is desirable, if not necessary, to operate the shaft 67 by hand in order to open the chucks, and this operation should not affect the timing of the opening and closing of the chucks with reference to the movements of the spindles and cooperating parts of the mechanism. In order to secure this result, I have provided a single-tooth clutch connection between the worm gear 66 and the shaft 67 (see Figs. 5 and 8). The clutch comprises a sleeve 103 carried by the worm gear and by means of which the latter is mounted in a journal housing 104, the end of the sleeve opposite the worm gear being provided with a lock nut 105 threaded thereon. Secured to the sleeve 103 is the clutch collar 106 having a shoulder 107 adapted to engage a corresponding shoulder 108 on the collar 109 which is slidably keyed to the shaft 67, as shown at 110. A spring 111 bears at one end against a flange on the collar 109 and at its opposite end against a stop 112 pinned to the shaft. The arrow on Fig. 5 indicates the direction of rotation of the shaft 67 when the machine is operating. When it is desired to open any one or more of the chucks, a handle 113 is applied to the outer end of the shaft 67 (see Fig. 8) and the shaft is rotated in a backward direction. This will enable the clutch members 106 and 109 to slip past each other, due to the inclination of the cooperating faces thereof which are adjacent to the shoulders 107 and 108, and this rotation of the shaft will enable the operator to open up any particular chuck for removal of the work, or for purposes of inspection and repair. When the machine has again started in operation, the worm gear 66 will turn on the shaft 67 until the shoulders 107 and 108 engage each other, after which the shaft 67 will be rotated in the usual manner. This arrangement permits the reversal by hand of the rotation of the shaft 67 for the purposes specified, but without altering the timing relation that exists between the said shaft, when driven by power, and the cooperating parts of the machine.

In Figs. 15–18 inclusive there are shown somewhat diagrammatically, the manner in which the chucks, the threading devices, and the stops operate successively to permit the removal of the work from and its insertion into the chucks, the threading of the ends of the bolt blanks so inserted, and their removal after threading.

In Fig. 15, the first or right hand die head 30 is in its rearward position and the rock shaft 33 thereabove has been operated by its cams 33ᶜ to bring the work stop 39 in front of the cutting dies 31. Shortly before this time, the jaws 89 of a chuck opposed thereto have been opened by their cams 73, 74 and the springs 82 and 83 to permit the removal of the work therefrom. Therefore, when the parts 30, 31 and 33 are in the positions shown at the right hand of Fig. 15, the operator can insert a new blank into the chuck therein with the end to be threaded in engagement with the stop 39. Meanwhile, the second die head from the right has practically completed its cutting operation, the fourth die head from the right has started on its cutting operation while the third from the right has assumed a position intermediate between that of the second and fourth heads.

In the next cycle of operation (see Fig. 16), the jaws of the first or right hand chuck have been closed by their cams 73, 74, the corresponding spindle 18 has been moved forward so that its die has started to cut a thread on the end of a blank 114 and the corresponding rock shaft has been rotated by its cam to move its stop arm 39 out of the way of the die head. Meanwhile, however, the second die head, the second rock shaft 33, the second stop 39 and the second chuck jaws 89 have assumed the positions shown for the corresponding parts at the right hand of Fig. 15, whereby the operator will have been enabled to remove a threaded blank from such second chuck and to insert a new blank therein with one end bearing against the stop 39 opposed thereto. The third die head from the right has practically completed its cutting operation and the fourth die head from the right has completed about half of its cutting operation.

In the third cycle of operation (see Fig. 17), the two right hand die heads are cutting threads on the bolt blanks 114, but the third set comprising the rock shaft 33, the die head 30, the stop 39 and jaws 89 have assumed the positions shown for the first set at the right hand of Fig. 15. The fourth die head from the right has practically completed its cutting operation; the right hand die head is approximately half way through with its cutting operation while the second die head from the right has just started its cutting operation.

In Fig. 18, the fourth cycle is shown, wherein the fourth set comprising the right-hand rock shaft 33, die head 30, stop 39 and chuck jaws 89 are in the same positions as the corresponding parts of the first set from the right of Fig. 15, which will enable the new bolt blank to be dropped into the fourth or left-hand chuck with one end against the stop 39. Meanwhile, the right hand die head will have practically completed its cutting operation, the second die head from the right will have completed about half its cutting operation while the third from the right will have just started such cutting operation. At the end of this fourth cycle, the cycles of operations described will be repeated, beginning with the first or right-hand set of mechanisms, as shown in Fig. 15.

Having thus described my invention, what I claim is:—

1. In a machine of the character described, the combination of a plurality of chucks, a spindle cooperating with each of said chucks, means for rotating said spindles, threading mechanism carried by each of said spindles, means for moving each of said spindles toward and from its cooperating chuck, a work stop for each such threading mechanism, means operative by the spindle-moving means for moving each such stop in front of its cooperating threading mechanism when the spindle carrying such mechanism is in its retracted position with reference to its cooperating chuck, means operative by the spindle-moving means for opening each chuck and each threading mechanism at the end of the threading operation performed by such mechanism, means operative by the spindle-moving means for closing each chuck when the cooperating spindle is in its retracted position, means operative by the spindle-moving means for moving each stop from in front of its cooperating threading mechanism in advance of the movement of such mechanism toward its chuck, and means for closing each chuck and each threading mechanism in advance of such movement.

2. In a machine of the character described, the combination of a plurality of chucks, a spindle cooperating with each of said chucks, means for rotating said spindles, threading mechanism carried by each of said spindles, means for moving each of said spindles toward and from its cooperating chuck, a work stop for each such threading mechanism, means operative by the spindle-moving means for moving each such stop in front of its cooperating threading mechanism when the spindle carrying such mechanism is in its retracted position with reference to its cooperating chuck, means operative by the spindle-moving means for opening each chuck at the end of the threading operation performed by such mechanism, means operative by the spindle-moving means for closing each chuck when the cooperating spindle is in its retracted position, and means operative by the spindle-moving means for moving each stop from in front of its cooperating threading mechanism in advance of the movement of such mechanism toward its chuck.

3. In a machine of the character described, the combination of a plurality of chucks, a spindle cooperating with each of said chucks, means for rotating said spindles, a rock shaft pivoted adjacent to each spindle, means for moving the said spindles toward and from their respective chucks, a work stop carried by each rock shaft, and means operative through the reciprocating movements of each spindle for rocking the shaft cooperating therewith to bring the work stop carried thereby in front of each spindle and the threading mechanism thereon when the said spindle is in its retracted position and for moving the stop away from such position in advance of the forward movement of said spindle.

4. In a machine of the character specified, the combination of a plurality of chucks, a spindle opposed to and cooperating with each chuck, means for rotating said spindles, threading mechanism carried by each spindle, springs serving to force said spindles forwardly toward their respective chucks, a cam shaft, cams on said shaft for moving each spindle rearwardly at the end of its threading operation, rock shafts mounted adjacent the said spindles respectively, a work stop carried by each rock shaft, and connections between each spindle and a rock shaft for operating the said shafts to bring their stops in front of the respective threading mechanisms when the spindles are retracted and for moving the stops out of the way of such mechanisms in advance of the forward movements of the spindles.

5. In a machine of the character described, the combination of a plurality of chucks, a spindle cooperating with each chuck and movable toward and from the same, threading mechanism carried by each spindle, a shaft, driving connections between the said shaft and the said spindles for rotating the latter, a rock shaft mounted adjacent to each spindle and each having a work stop adapted to be moved in front of and away from such mechanism, a cam shaft having cams thereon corresponding to said spindles, a pivotally supported arm for each spindle adapted to be engaged by a cam on the cam shaft, a connection between each such arm and a spindle for moving the latter away from its cooperating chuck, means including a spring-pressed member for rocking each rock shaft in one direction, each arm having an extension adapted to engage said member whereby the spring which operates said member will also move the cooperating spindle toward its chuck, and means slidably mounted on each rock shaft for opening and closing the threading mechanism of the spindle cooperating therewith.

6. In a machine of the character described, the combination of a plurality of chucks, a spindle opposed to and corresponding to each of said chucks, threading mechanism carried by each spindle, means for rotating the said spindles, means for moving the spindles toward and from their respective chucks and for opening and closing the threading mechanism carried respectively thereby, a work stop for each such spindle and threading mechanism, means operated by the movements of the spindles toward and from their respective chucks for operating the stops to move the same in front of the threading mechanisms and out of the way of such mechanisms, and means cooperating with the spindle-operating means for automatically opening and closing the said chucks.

7. In a machine of the character described, the combination of a plurality of chucks, a spindle cooperating with each of said chucks, means for rotating said spindles, means for obtaining relative movement between said chucks and the spindles respectively opposed thereto, threading mechanism carried by each spindle, a work stop for each threading mechanism and means for automatically moving each stop in front of its threading mechanism by the separation of the said mechanism and the chuck cooperating therewith and for automatically removing the stop from in front of said mechanism by the movement of the spindle and chuck toward each other.

8. In a machine of the character described, the combination of a plurality of chucks, a spindle cooperating with each of said chucks, means for rotating said spindles, means for obtaining relative movement between said chucks and the spindles opposed thereto, threading mechanism carried by each spindle, a work stop for each threading mechanism, means for automatically moving each stop in front of its threading mechanism by the separation of the said mechanism and the chuck cooperating therewith and for automatically removing the stop by the movement of the spindle and chuck toward each other, and means for opening and closing the threading mechanism of each spindle.

9. In a machine of the character described, the combination of a plurality of chucks, a spindle cooperating with each of said chucks, means for rotating said spindles, threading mechanism carried by each of said spindles, means for moving each of said spindles toward and from its cooperating chuck, a work stop for each such threading mechanism, and means operative by the movement of each spindle for moving each such stop in front of its cooperating mechanism when the spindle carrying such mechanism is in its retracted position.

10. In a machine of the character described, the combination of a plurality of chucks, a spindle cooperating with each of said chucks, means for rotating said spindles, means for moving said spindles toward and from said chucks, threading mechanism carried by each spindle, a work stop cooperating with each such mechanism and movable to and from work-intercepting position in front of said mechanism, and means operative by the spindle-moving means for automatically opening each chuck at the completion of the threading operation on the work held thereby and for automatically closing each chuck after the work stop shall have been moved from in front of the threading mechanism opposed to such chuck.

11. In a machine of the character described, the combination of a series of chucks, means for opening and closing the same in succession, a spindle opposed to each such chuck, each spindle being provided with threading mechanism means for moving the said spindles successively and in timed relation toward and from their respective chucks, a series of work stops, one for each threading mechanism, and means operative by the spindle-moving means for moving each of said stops in front of the threading mechanism on the spindle cooperating therewith when such spindle is in a retracted position and for moving each stop away from such position in advance of the movement of the spindle and of the threading mechanism carried thereby toward its chuck.

12. In a machine of the character described, the combination of a plurality of chucks each comprising a pair of relatively movable jaws, a drive shaft, a plurality of spindles cooperating with said chucks respectively, connections between said drive shaft and said spindles for rotating the latter, a second shaft, connections between said second shaft and said chuck jaws for opening and closing the latter, and means including a slip clutch mechanism for driving the second shaft from the first shaft.

13. In a machine of the character described, the combination of a plurality of chucks, a spindle opposed to and cooperating with each of said chucks, threading mechanism carried by each spindle, means for rotating the said spindles, means for obtaining relative movement between the said chucks and the spindles respectively opposed thereto, a work stop for each such spindle and threading mechanism, means operated by the movement of the said chucks and spindles toward and from each other for operating the stops to move the same in front of their respective threading mechanisms and out of the way of such mechanisms, and means operated by such relative movement of the chucks and spindles for automatically opening and closing the said chucks.

14. In a machine of the character described, the combination of a plurality of chucks, a spindle opposed to and cooperating with each of said chucks, threading mechanism carried by each spindle, means for rotating the said spindles, means for obtaining relative movement in succession between each chuck and the spindle opposed thereto, a work stop for each threading mechanism, means operated by the relative movements between each chuck and the spindle cooperating therewith for operating the said stops successively thereby to bring the stops in work-intercepting relation to their respective threading mechanisms by the separation of the said chucks and spindles.

15. In a machine of the character described, the combination of a plurality of chucks each comprising a pair of relatively movable jaws, a shaft, connections between said shaft and said chucks for opening and closing the jaws of the latter, a plurality of spindles cooperating with said chucks respectively, a second shaft and connections between said shaft and said spindles for rotating the latter, a driving connection between the second shaft and the first shaft, the said driving connection comprising a gear driven by the second shaft, a gear on the first shaft meshing with the last mentioned gear, and a single-toothed clutch on the first mentioned shaft and connecting the gear thereon with such shaft.

16. In a machine of the character described, the combination of a plurality of chucks, a spindle cooperating with each chuck and movable toward and from the same, threading mechanism carried by each spindle, a shaft, driving connections between the said shaft and the said spindles for rotating the latter, a rock shaft mounted adjacent each spindle and each having a work stop adapted to be moved in front of and away from the threading machanism adjacent thereto, an arm operatively connected to each spindle and each rock shaft for reciprocating the same toward and from the chuck cooperating therewith, means operated by the first mentioned shaft and cooperating with it and said arms for moving each spindle and the rock shaft mounted adjacent thereto in one direction with reference to the chuck cooperating therewith, a spring for moving each rock shaft in the opposite direction, means operated by the movement of each rock shaft away from the cooperating chuck for rotating the shaft to bring the stop thereon in front of the threading mechanism on the spindle with which it cooperates, and means operated by the reciprocating movement of each spindle and its cooperating rock shaft for opening and closing the threading mechanism of each such spindle.

In testimony whereof, I hereunto affix my signature.

HARRY C. ELLISON.